(12) United States Patent
Kim et al.

(10) Patent No.: US 7,847,891 B2
(45) Date of Patent: Dec. 7, 2010

(54) LIQUID CRYSTAL DISPLAY

(75) Inventors: Sun-mi Kim, Icheon (KR); Ji-voung Jeong, Cheonan-si (KR); Yun-seok Lee, Cheonan-si (KR); Seok-voon Yang, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 4 days.

(21) Appl. No.: 11/989,898

(22) PCT Filed: Aug. 1, 2006

(86) PCT No.: PCT/KR2006/003020

§ 371 (c)(1),
(2), (4) Date: Feb. 1, 2008

(87) PCT Pub. No.: WO2007/015621

PCT Pub. Date: Feb. 8, 2007

(65) Prior Publication Data

US 2009/0284695 A1    Nov. 19, 2009

(30) Foreign Application Priority Data

Aug. 1, 2005    (KR) .................... 10-2005-0070394

(51) Int. Cl.
*G02F 1/1333* (2006.01)

(52) U.S. Cl. ..................................... 349/106

(58) Field of Classification Search .................. None
See application file for complete search history.

(56) References Cited

U.S. PATENT DOCUMENTS

| 4,470,667 | A  | * | 9/1984 | Okubo et al. ................. 349/42 |
| 6,348,958 | B1 |   | 2/2002 | Matsuoka et al. |
| 2003/0160916 | A1 | * | 8/2003 | Nakagawa et al. .......... 349/106 |
| 2004/0126678 | A1 |   | 7/2004 | Baek et al. |
| 2004/0130253 | A1 | * | 7/2004 | Ohsaki et al. ............... 313/110 |
| 2004/0135957 | A1 |   | 7/2004 | Arai |
| 2004/0233375 | A1 |   | 11/2004 | Chung et al. |

FOREIGN PATENT DOCUMENTS

| JP | 11-2718 A | * | 1/1999 |
| JP | 11-64837 A | * | 3/1999 |
| JP | 2004-246189 A | * | 9/2004 |
| KR | 1020030057144 | | 7/2003 |
| KR | 1020040003095 | | 1/2004 |

* cited by examiner

*Primary Examiner*—Mike Stahl
(74) *Attorney, Agent, or Firm*—F. Chau & Associates, LLC (57) ABSTRACT

A liquid crystal display is provided. The liquid crystal display includes a first substrate and a second substrate facing and spaced apart from each other in a predetermined distance, in which the second substrate has a first area in which color filters are formed over a plurality of pixel regions and a second area in which the color filters are formed at each of the plurality of pixel regions.

11 Claims, 11 Drawing Sheets

IIb - IIb'

LIQUID CRYSTAL DISPLAY

TECHNICAL FIELD

The present invention relates to a liquid crystal display, and more particularly, to a liquid crystal display that can prevent edge failures of a liquid crystal panel.

BACKGROUND ART

A liquid crystal display (LCD) displays information using electrical and optical properties of liquid crystals injected into a liquid crystal panel. Compared to CRTs, LCDs have notable advantages in that they are smaller and lighter, and in addition to having low power consumption, they require low driving voltages. Due to such advantages, LCDs have wide applications in portable computers, desktop computer monitors, monitors of high-quality image display devices.

Generally, LCDs include a liquid crystal panel assembly and a backlight assembly. The liquid crystal panel assembly has a liquid crystal panel formed by injecting liquid crystals having dielectric anisotropy into a space between a first substrate and a second substrate, a driving integrated circuit (IC) mounted on the liquid crystal panel by a chip-on-glass (COG) and supplying corresponding driving signals to gate lines and data lines arranged on the liquid crystal panel, a printed circuit board transmitting pre-determined data and control signals to the driving IC, and a flexible printed circuit board connecting the printed circuit board to the driving IC. The liquid crystal panel assembly is combined with the backlight assembly which has a lamp assembly and various optical sheets, thus completing the LCD.

In conventional LCDs, a black matrix, color filters, an overcoat layer for planarizing a surface of the color filters, and a common electrode are sequentially formed on an insulating substrate provided on a second substrate, the common electrode on the insulating substrate provided on the second substrate changing the orientation of molecules in a liquid crystal layer by a potential difference from a pixel electrode provided on a first substrate. Here, the color filters may be arranged in a stripe shape, a mosaic shape, a delta shape, a square shape, or the like. In the case of forming color filters in a stripe shape, the respective color filters are formed at openings present in the same line. Alternatively, the respective color filters may be formed at openings on the black matrix in an island shape.

Figure 1:
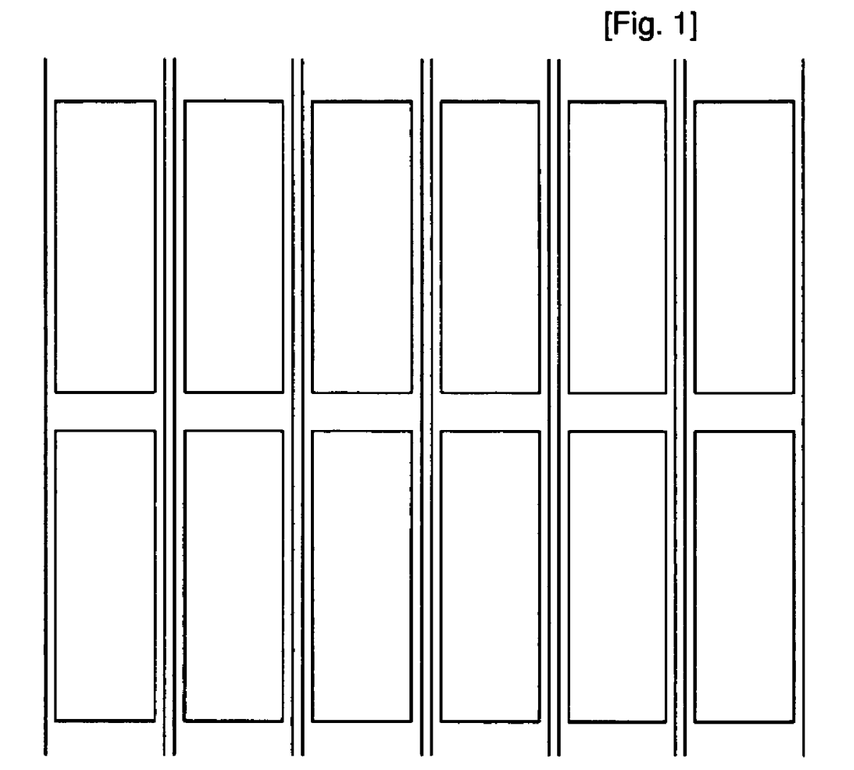
FIG. 1 is a layout view of a portion of a second substrate of a conventional liquid crystal display (LCD)

FIG. 1 is a layout view of a portion of a second substrate of a conventional liquid crystal display (LCD) illustrating an exemplary embodiment of color filters formed in a stripe shape.

An overcoat layer and a common electrode are sequentially formed on the color filters, or island arrangement, and column spacers are formed on the common electrode for maintaining a uniform cell gap between the first substrate and the second substrate. As described above, after forming the column spacers, the first substrate and the second substrate are combined, thus completing the liquid crystal panel.

When combining the first substrate and the second substrate, a sealant is applied to the edge of the first substrate, a liquid crystal material is dispensed into an edge portion, and the first and second substrates are aligned to then be combined.

In the course of dispensing liquid crystal into the first substrate, an excessive amount of liquid crystal may be dispensed. In such a case, excess liquid crystal may move toward the edge of the liquid crystal panel, resulting in an increase of a cell gap between the two substrates along the edge of the liquid crystal panel. That is, the column spacers are overlapped with the black matrix, the color filter layer, the overcoat layer and the common electrode on the second substrate. In addition, the column spacers are formed to a uniform height. In the case where the first and second plate are combined, an excessive amount of liquid crystal moves toward the edge of the liquid crystal panel, increasing a cell gap at edge portions of the liquid crystal panel, which eventually results in having a liquid crystal layer with uneven thickness.

As described above, if the thickness of the liquid crystal layer is not uniform, light is non-uniformly transmitted through the liquid crystal layer, which results in decreasing the manufacturing yield.

Thus, there is a need to prevent the change in the cell gap at the edge portion of a liquid crystal panel when excessive liquid crystal is dispensed into the liquid crystal panel.

DISCLOSURE OF INVENTION

Technical Problem

To solve the above problems, it is an object of the present invention to provide a liquid crystal display that can prevent the edge failure in a liquid crystal panel, which is generated when excessive liquid crystal is dispensed between a first substrate and a second substrate of a liquid crystal panel.

The above and other objects, features and advantages, of the present invention will become clear to those skilled in the art upon review of the following description, the attached drawings and appended claims.

Technical Solution

To accomplish the above object of the present invention, there is provided a liquid crystal display device including a first substrate and a second substrate facing and spaced apart from each other in a predetermined distance, in which the second substrate has a first area in which color filters are formed over a plurality of pixel regions and a second area in which the color filters are formed at each of the plurality of pixel regions.

Additional advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Advantageous Effects

The liquid crystal display (LCD) according to an embodiment of the present invention, color filters in the first area of the second substrate are formed over a plurality of pixel regions and color filters in the second area of the second area are formed separately at each pixel region, so as to secure more liquid crystal margin in the first area than liquid crystal margin in the second area. Accordingly, in a step of combining the first substrate with the second substrate, the thickness of the liquid crystal layer can be prevented from increasing at edge portions of the first substrate with the second substrate even when excessive liquid crystal is dispensed into the liquid crystal panel.

DESCRIPTION OF THE REFERENCE NUMERALS ABOUT MAIN ELEMENTS IN THE DRAWINGS

1: a Liquid Crystal Display (LCD)
2, 210, 300: a first substrate
3, 310, 200: a second substrate
4: a liquid crystal layer
10, 90: a insulating substrate
22: a gate line
24: a gate line terminal
26: a gate electrode
28: a storage electrode line
29: a storage electrode
30: a gate insulating layer
40: a semiconductor layer
45, 46: a ohmic contact layer
52: a data line
54: a data line terminal
55: a source electrode
56: a drain electrode
70: a passivation layer
72: a first contact hole
73: a second contact hole
74, 76: a contact hole
82: a pixel electrode
91: a color filter
91R: a red sub color filter
91G: a green sub color filter
91B: a blue sub color filter
92: a black matrix
94: a common electrode
97S: a first column spacer
97i: a second column spacer
95: a overcoat layer
S: a first area
I: a second area

MODE FOR THE INVENTION

A liquid crystal display (LCD) 1 according to an embodiment of the present invention includes a first substrate, a second substrate, and a liquid crystal layer interposed between the first substrate and the second substrate. Here, the second substrate has a first area in which color filters are formed over a plurality of pixel regions and a second area in which color filters are formed at each pixel region. The second area is formed at display regions while the second area is formed at nondisplay regions other than the display regions, that is, image displaying regions, on the second substrate. The first area may be provided at a predetermined width, e.g., 7 m, along the peripheral area of the second substrate.

LCDs can be classified into a vertically aligned (VA) type LCD in which a TFT and a color filter are formed on the first substrate and the second substrate, respectively, an in-plane switching (IPS) type LCD, and the like according to the driving type. LCDs may also be classified into an LCD in which a TFT and a color filter are formed on the first substrate and the second substrate, respectively, and a color filter on thin film transistor (COT) type LCD in which a color filter and a TFT are formed on the same substrate, e.g., the first substrate, according to the configuration. The LCDs according to various embodiments of the present invention may embrace all of the types mentioned above. That is, the LCDs according to various embodiments of the present invention may include, for example, a VA type LCD in which a TFT and a color filter are formed on the first and second substrates, respectively, a COT VA type LCD in which a TFT and a color filter are formed on the second substrate, an IPS type LCD in which a TFT and a color filter are formed on the first and second substrates, respectively, an IPS type LCD in which a TFT and a color filter are formed on the second substrate, and the like.

Hereinafter, a VA type LCD in which a TFT and a color filter are formed on a first substrate and a second substrate, respectively, will be described as a first embodiment of the present invention. Then, a VA type LCD in which a TFT and a color filter are formed on a second substrate will be described as a second embodiment of the present invention. Next, an IPS type LCD in which a TFT and a color filter are formed on each of a first substrate and a second substrate will be described as a third embodiment of the present invention.

Various embodiments of the present invention will now be described with reference to the accompanying drawings. An LCD 1 according to the first embodiment of the present invention will now be described with reference to FIGS. 2 through 7.

Figure 2:
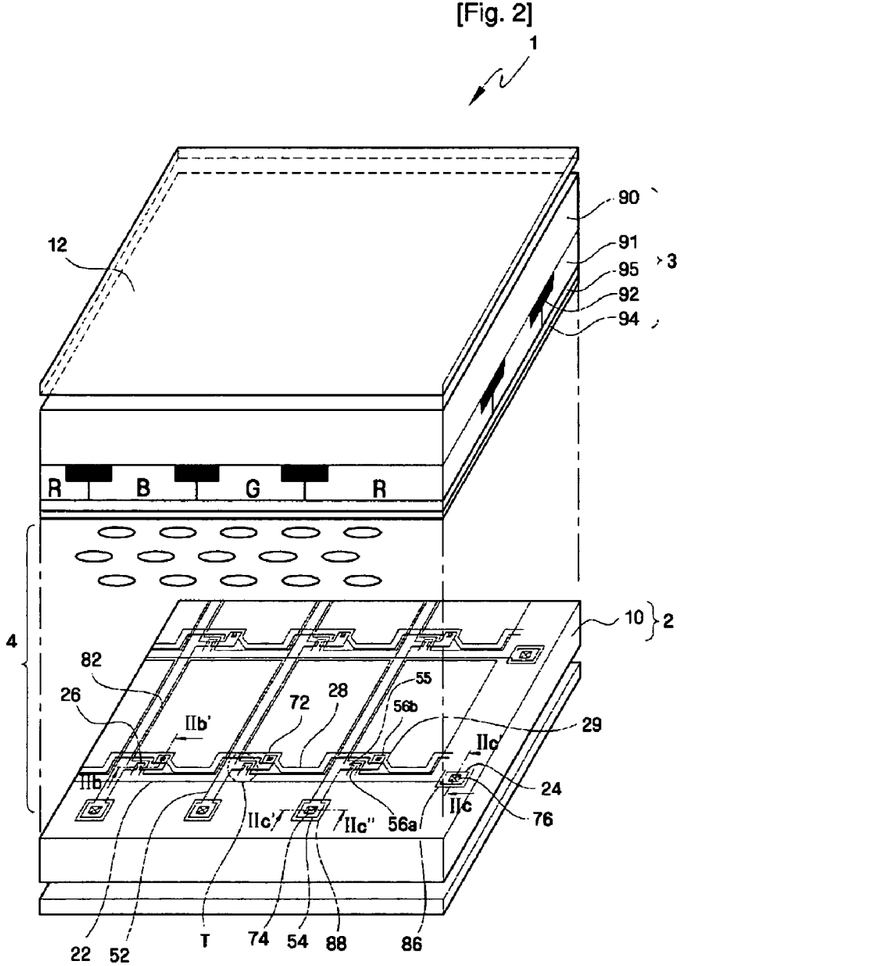
FIG. 2 is a partial perspective view of an LCD of a first embodiment of the present invention.
Figure 3:
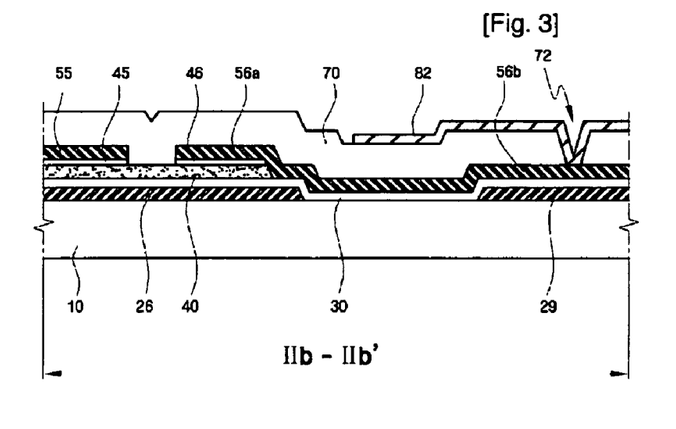
FIG. 3 is a cross-sectional view taken along a line IIb-IIb' of FIG. 2.
Figure 4:
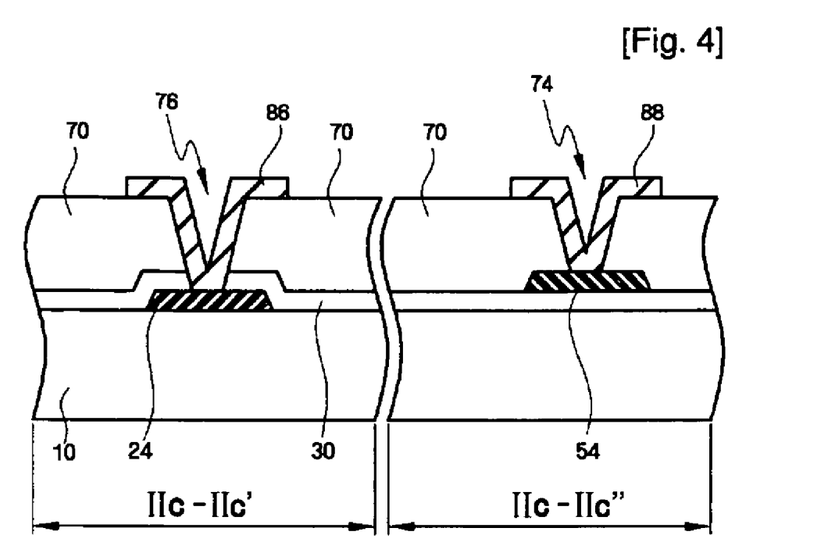
FIG. 4 is a cross-sectional view taken along lines IIc-IIc' and IIc'-IIc" of FIG. 2.
Figure 5:
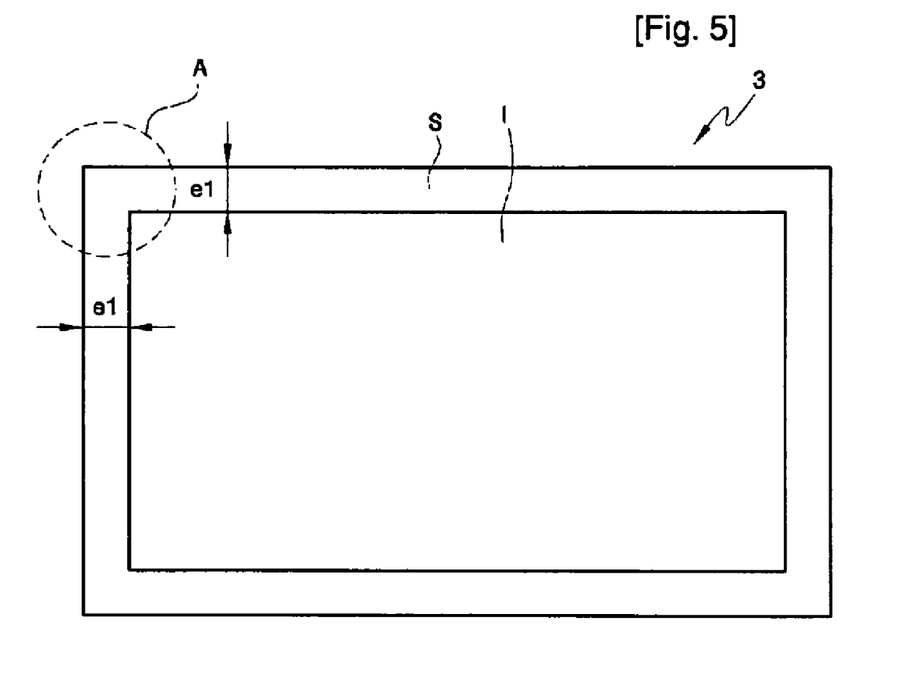
FIG. 5 is a plan view showing a second substrate of the LCD shown in FIG. 2.
Figure 6:
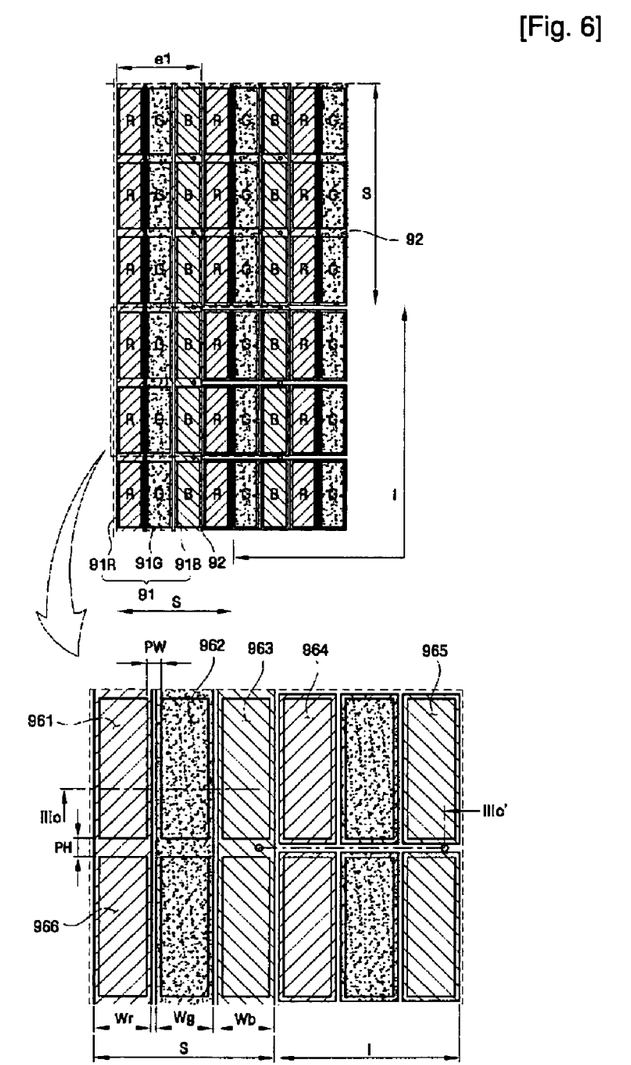
FIG. 6 is an enlarged view showing a portion "A" of FIG. 5.
Figure 7:
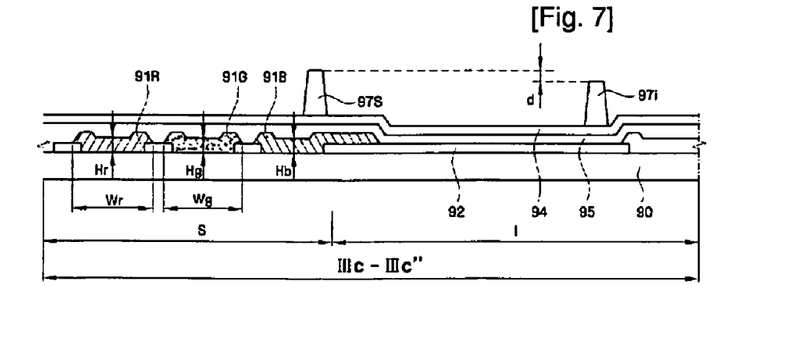
FIG. 7 is a cross-sectional view taken along a line IIIc-IIIc' of FIG. 6.
Figure 8:
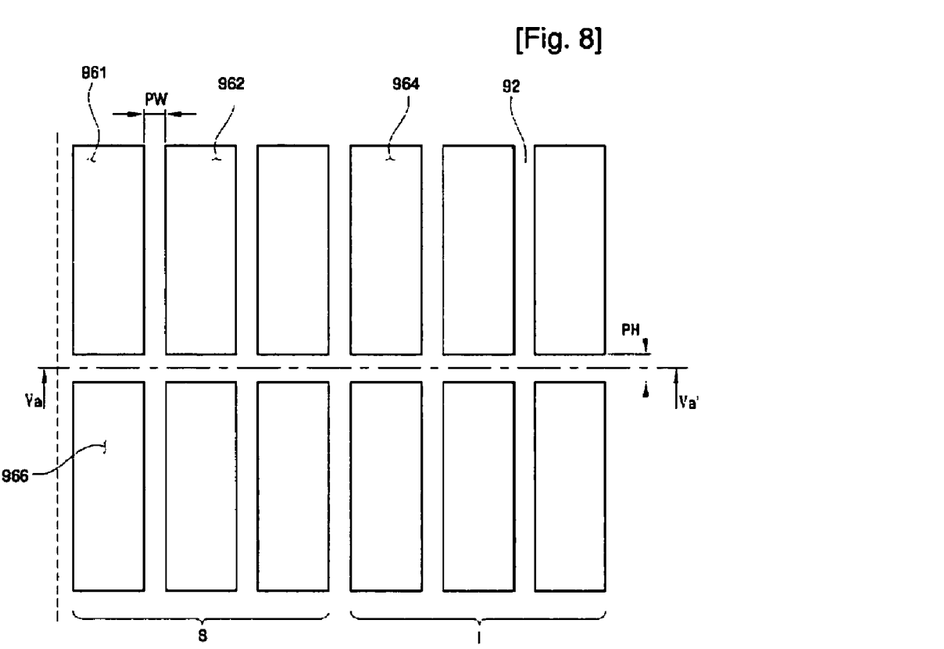
FIGS. 8 through 12 are plan views showing processing steps of the second substrate shown in FIG. 5.

FIG. 2 is a partial perspective view of an LCD according to a first embodiment of the present invention, FIG. 3 is a cross-sectional view taken along a line IIb-IIb' of FIG. 2, FIG. 4 is a cross-sectional view taken along lines IIc-IIc' and IIc'-Ic" of FIG. 2, FIG. 5 is a plan view showing a second substrate of the LCD shown in FIG. 2, FIG. 6 is an enlarged view showing a portion "A" of FIG. 5, and FIG. 7 is a cross-sectional view taken along a line IIIc-IIIc' of FIG. 6.

Referring first to FIGS. 2 and 3, the LCD 1 according to the first embodiment of the present invention includes a first substrate 2, a second substrate 3 opposite to and spaced a predetermined distance apart from the first substrate 2, a liquid crystal layer 4 interposed between the first substrate 2 and the second substrate 3 and having liquid crystal molecules aligned in a predetermined direction.

The first substrate 2 has a plurality of gate lines 22 arranged in a transverse direction on an insulating substrate 10 and a plurality of data lines 52 insulated from and arranged perpendicular to the gate lines 22. A pixel region is defined at each of intersecting regions of the plurality of gate lines 22 and the plurality of data lines 52. Here, the pixel region indicates a region through which light is transmitted to display an image. A pixel electrode 82 is formed at each pixel over the gate line 22 and the data line 52. Each pixel has a thin film transistor 'T' connected to the gate line 22, the data line 52 and the pixel electrode 82.

Meanwhile, a black matrix 92, a color filter 91, an overcoat layer 95 and a common electrode 94 are sequentially formed on one plane of the second substrate 3. The black matrix 92 is positioned at a boundary area of the color filter 91 and prevents light leakage, regions where the orientation of the liquid crystal layer 4 is not controlled. The color filter 91, which is composed of R, G, and B sub color filters 91R, 91G, and 91G, each formed on the black matrix 92, allows light of a predetermined wavelength to pass through the color filters. The overcoat layer 95 planarizes a surface of the color filter 91 to enhance adhesion between the color filter 91 and the common electrode 94. The second substrate 3 will be described later in more detail with reference to FIGS. 5 and 6.

A lower polarizing plate 11 and an upper polarizing plate 12 transmitting only light parallel with the polarizing axes are positioned to exterior surfaces of the first and second substrates 2 and 3. Additionally, as a separate light source, a backlight (not shown) may be positioned below the lower polarizing plate 11.

Now, the first substrate 2 is described in more detail with reference to FIGS. 2 and 3. With regard to the first substrate 2, the gate line 22 is formed on the insulating substrate 10 in a transverse direction, and a gate electrode 26 is connected to the gate line 22 in the form of a protrusion. A gate line terminal 24 for applying a gate signal from another layer or an external circuit and transmitting the received gate signal to the gate line 22 is formed at an end of the gate line 22. The width of the gate line terminal 24 is expanded to be connected to an external circuit. The gate line 22, the gate line terminal 24, and the gate electrode 26 constitute a gate wire (22, 24, 26).

In addition, a storage electrode line 28 and a storage electrode 29 are formed on the insulating substrate 10. The storage electrode line 28 extends substantially in a transverse direction across a pixel area. The storage electrode 29 is branched from the storage electrode line 28 and has a wider width than the storage electrode line 28. The storage electrode line 28 and the storage electrode 29 constitute a storage electrode wire (28, 29). The shapes and arrangements of the storage electrode 29 and the storage electrode line 28 may vary in various ways. A voltage that is the same as that applied to the common electrode 94 of the second substrate 3 is applied to the storage electrode wire (28, 29).

The gate wire (22, 24, 26) and the storage electrode wire (28, 29) are preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta.

In addition, the gate wire (22, 24, 26) and the storage electrode wire (28, 29) may have a multi-layered structure including two conductive films (not shown) having different physical characteristics. One of the two films is preferably made of a low resistivity metal including Al containing metal, Ag containing metal, and Cu containing metal for reducing signal delay or voltage drop in the gate wire (22, 24, 26). The other film is preferably made of material such as a Mo containing metal, Cr, Ta or Ti, which have good physical, chemical, and electrical contact characteristics with other materials such as indium tin oxide (ITO) or indium zinc oxide (IZO). Examples of combinations of the two films are a lower Cr film and an upper Al (Al alloy) film and a lower Al (Al alloy) film and an upper Mo (Mo alloy) film. However, the gate wire (22, 24, 26) may be made of various metals or conductors.

A gate insulating layer 30 is formed on the gate wire (22, 24, 26) and the storage electrode wire (28, 29).

A semiconductor layer 40 made of hydrogenated amorphous silicon or poly-crystalline silicon is formed on the gate insulating layer 30. The semiconductor layer 40 may be formed in various shapes such as an island shape or a stripe shape. Ohmic contact layers 45 and 46, which are made of silicide or n+ amorphous silicon hydride in which an n-type impurity is highly doped, are formed on the semiconductor layer 40. The ohmic contact layers 45 and 46 may have a variety of shapes, including an island shape, a stripe shape, and so on. When the ohmic contact layers 45 and 46 are formed in a stripe shape, they may extend below the data line 52.

The data line 52 and the drain electrode 56 are formed on the ohmic contact layers 45 and 46 and the gate insulating layer 30. The data line 52 extends lengthwise and intersects the gate line 22 to define a pixel.

A data line terminal 54 for applying a data signal from another layer or an external circuit and transmitting the received gate signal to the data line 52 is formed at an end of the data line 52. The width of the data line terminal 54 is expanded to be connected to an external circuit.

The source electrode 55 protrudes from the data line 52 in the form of a protrusion appearing at every pixel and extends over the ohmic contact layer 45. That is, the source electrode 55 is formed to partially intersect the gate electrode 26 and the semi-conductor layer 40.

The drain electrode (522, 523) is separated from the source electrode 55 and positioned on the ohmic contact layer 46 to be opposite to the source electrode 55 in view of the gate electrode 26. The drain electrode (522, 523) consists of an electrode portion 522 overlapping with the gate electrode 26 and the semiconductor layer 40 and a pad portion 523 extending from the electrode portion 522 having an expanded area. The drain electrode pad portion 523 is formed to overlap with the storage electrode 29 to form a storage capacitor with the gate insulating layer 30 interposed therebetween. The data line 52, the data line terminal 54, the source electrode 55, and the drain electrode 56 constitute a data wire (52, 54, 55, 56). The data line 52 may be formed in various shapes. For example, the data line 52 may be formed in a stripe shape extending in a longitudinal direction or in such a way that a bent portion and a vertically extending portion periodically appear in a cycle period corresponding to one pixel length. Accordingly, the pixel defined by the intersecting gate line 22 and data line 52 may be shaped of, but not limited to, a rectangle, a bent band, or the like, according to the shape of the data line 52. In the following description, the invention will be explained with regard to a rectangular pixel by way of example.

The data line 52, the source electrode 55, and the drain electrode 56 are preferably formed of chromium (Cr), a molybdenum (Mo) containing metal, a refractory metal such as tantalum (Ta) or titanium (Ti). In addition, the data line 52, the source electrode 55, and the drain electrode 56 may be formed as a single layer or a multiple layer including a lower film (not shown) made of a refractory metal film and a low-resistivity upper film (not shown). Examples of the multiple layers include a double-layered structure having a lower Cr film and an upper Al (Al alloy) film, a double-layered structure having a lower Mo (Mo alloy) film and an upper Al (Al alloy) film, and a triple-layered structure having a lower Mo film, an intermediate Al film, and an upper Mo film.

The gate electrode 26, the semiconductor layer 40, the source electrode 55, and the drain electrode 56 form a thin film transistor 'T', which serves as a switching element.

Meanwhile, a passivation layer 70 made of an organic insulating layer is formed on the data line 52, the drain electrode 56 and the exposed semiconductor layer 40. Here, the passivation layer 70 is preferably made of an inorganic material such as silicon nitride or silicon oxide, a photosensitive organic material having a good flatness characteristic, or a low dielectric insulating material such as a-Si:C:O and a-Si:O:F formed by plasma enhanced chemical vapor deposition (PECVD).

Contact holes 74 and 72 are formed on the passivation layer 70 to expose the data line terminal 54 and the pad portion 523 of the drain electrode 56, respectively, and the contact hole 76 exposing the gate line terminal 24 is formed on the passivation layer 70 and the gate insulating layer 30.

Here, the pixel electrode 82, which is electrically connected to the pad portion 523 of the drain electrode 56, is formed according to the shape of the pixel over the contact hole 72 exposing the pad portion 523 of the drain electrode 56.

In addition, an auxiliary data line terminal 88 and an auxiliary gate line terminal 86 connected to the data line terminal 54 and the gate line terminal 24 via the contact hole 76 are also formed on the passivation layer 70. Here, the pixel electrode 82, the auxiliary gate line terminal 86 and the auxiliary data line terminal 88 are made of a transparent conductor such as ITO or IZO or a reflective conductor such as Al. The auxiliary gate line terminal 86 and the auxiliary data line terminal 88 complement adhesions of the gate line terminal 24 and the data line terminal 54 to external circuit devices.

The pixel electrode 82 is physically and electrically connected to the drain electrode 56 via the contact hole 76 and receives a data voltage from the source electrode 55. The pixel electrode 82 supplied with the data voltage and a common electrode 94 of the second substrate 3 produce an electric field to determine the orientation of liquid crystal molecules of the liquid crystal layer 4 interposed between the pixel electrode 82 and the common electrode 94.

Next, the second substrate 3 will be described in more detail with reference to FIGS. 5 through 7.

Referring to FIGS. 5 through 7, the second substrate 3 has a first area S where color filters are formed over a plurality of pixel regions, and a second area I where a color filter is formed at each pixel region. Here, the first area S is formed at a non-display region other than a display region while the second area I is formed at the display region, that is, an image displaying region, on the second substrate 3. The first area S may be provided at a predetermined width, e.g., 3 cm, along the peripheral area of the second substrate 3.

The second substrate 3 includes an insulating substrate 90, a black matrix 92 formed on the insulating substrate 90, a color filter 91 formed on the black matrix 92 formed on the first area S and the second area I, an overcoat layer 95 formed on the color filter 91, a common electrode 94 formed on the overcoat layer 95, a first column spacer 97S formed on the first area S of the color filter 91 so as to overlap with the black matrix 92, and a second column spacer 97S formed on the second area I of the color filter 91.

In more detail, the black matrix 92, which is made of an opaque material, is formed on the insulating substrate 90 in a matrix arrangement. In order to allow light having transmitted through the first substrate 2 to transmit through an upper portion of the second substrate 3, an opening 961 is formed at a portion of the black matrix 92. The opening 961 is generally formed at a region corresponding to the pixel of the first substrate 2. For example, In the case of a rectangular pixel, the opening 961 of the black matrix 92 is formed in a rectangular shape in conformity of the shape of the pixel. As an alternative example, In the case of a bent-band shaped pixel, the opening 961 of the black matrix 92 is also formed in a bent band shape. In the following description, the invention will be explained with regard to a rectangular opening (961) by way of example.

In the case where the opening 961 is rectangular, the opening 961 is preferably formed such that a ratio of a transverse length to a longitudinal length is 1:3, For example, if the transverse length of the opening 961 is 100 μ, the longitudinal length of the opening 961 is preferably 300 μm.

In the case of a large-size liquid crystal display apparatus, such as a digital TV, an opening may be formed to have transverse and longitudinal lengths of 200 μm and 600 μm, respectively.

The black matrix 92 is composed of a plurality of transverse lines and a plurality of longitudinal lines intersecting each other. Preferably, the width of the black matrix 92 in the longitudinal direction, that is, the pixel width (PW), may be in the range of, for example, 15 μm to 35 μm, and the width of the black matrix 92 in the transverse direction, that is, the pixel height (PH), may be in the range of, for example, 30 μm to 40 μm. The black matrix 92 may be made of chrome (Cr), chrome oxide (CrOx), or a polymeric resin.

The color filter 91, including red, green and blue sub color filters 91R, 91G and 91B, is formed on the black matrix 92. The red, green, and blue sub color filters 91R, 91G and 91B form a unit pixel.

In the first area S, red, green, and blue sub color filters 91R, 91G and 91B are preferably formed over a plurality of pixel regions. That is, in the first area S, the red, green, and blue sub color filters 91R, 91G and 91B are preferably formed over a plurality of openings on the black matrix 92. For example, the red sub color filter 91R is preferably formed straight over openings 961 and 966 existing on the same perpendicular line.

By contrast, in the second area I, red, green, and blue sub color filters 91R, 91G and 91B are preferably formed separately at a plurality of pixel regions. That is, in the second area I, the red, green, and blue sub color filters 91R, 91G and 91B are preferably formed separately at the respective openings on the black matrix 92. For example, the red sub color filter 91R is preferably formed at each of openings 964 existing on the black matrix 92.

In order to improve driving characteristics depending on transmittance of light, the respective sub color filters 91R, 91G and 91B may have different heights. For example, the red sub color filter 91R may have a height (Hr) of 1.6 μm, the green sub color filter 91G may have a height (Hg) of 1.7 μm, and the blue sub color filter 91B may have a height (Hb) of 1.8 μm. The overcoat layer 95 is formed on the color filter 91. The overcoat layer 95 planarizes a surface of the color filter 91 and enhances adhesion with the common electrode 94 to be described later. The overcoat layer 95 may be made of a transparent material, and may optionally be omitted.

On the overcoat layer 95 is formed the common electrode 94 for applying an electric field to the liquid crystal layer 4 by forming a potential difference from the pixel electrode 82 of the first substrate 2. The common electrode 94 may be made of a transparent conductive material such as indium tin oxide (ITO) or indium zinc oxide (IZO).

Pillar-shaped column spacers 97S and 97i for maintaining a cell gap of the liquid crystal panel are formed on the first area S and the second area I, respectively. Here, the column spacers 97S and 97i preferably have a height of approximately 3.3 µm. In addition, the column spacers 97S and 97i may be formed on non-transmissive regions, e.g., at least one among regions of the first substrate 2 corresponding to the gate electrode 26, the storage electrode line 28 and the thin film transistor T. For example, the column spacers 97S and 97i may be positioned on the transverse line PH of the black matrix 92 of each pixel. The column spacers 97S and 97i may be formed in various densities per area according to the size of the liquid crystal panel manufactured. For example, as shown in FIG. 5, the column spacers 97S and 97i may be formed at each pixel (unit pixel) having the blue sub color pixel 91B.

The formation of the column spacers 97S and 97i on the common electrode 94 in the above-described manner creates a predetermined height difference "d" between a top end of the column spacer 97S formed on the first area S and a top end of the column spacer 97i formed on the second area I. That is, the column spacer 97S formed on the first area S overlaps with the black matrix 92, the blue sub color filter 91B, the overcoat layer 95 and the common electrode 94 while the column spacer 97i formed on the second area I overlaps with the black matrix 92, the overcoat layer 95 and the common electrode 94. Here, the height difference "d" which is 60% the thickness of each of the sub color filters 91R, 91G and 91B, is created between the top end of the column spacer 97S formed on the first area S and the top end of the column spacer 97i formed on the second area I. That is, the overcoat layer 95 planarizes an uneven surface of the color filter 91.

In the case where the overcoat layer 95 is not formed, the height difference "d" between the top end of the column spacer 97S formed on the first area S and the top end of the column spacer 97i formed on the second area I becomes substantially the same with the thickness of the color filter 91.

As described above, if there is the height difference "d" between the top end of the column spacer 97S formed on the first area S and the top end of the column spacer 97i formed on the second area I, a space in which liquid crystal can be spread, that is, a liquid crystal margin, is secured in the first area S, unlike in the second area I, of the second substrate 3. Accordingly, in a subsequent step of combining the first substrate 2 with the second substrate 3, the thickness of the liquid crystal layer 4 can be prevented from increasing at edge portions of the first substrate 2 with the second substrate 3 even when excessive liquid crystal is dispensed into the liquid crystal panel resulting from the combining of the first substrate 2 and the second substrate 3.

Although not shown in the drawing, an alignment film for initial alignment of the liquid crystal layer 4 is formed on the column spacers 97S and 97i. That is, the column spacers 97S and 97i contact the first substrate 2 in a state in which the alignment film is interposed between the column spacers 97S and 97i.

The method of manufacturing the second substrate 3 will now be described with reference to FIGS. 8 through 21.

FIGS. 8 through 12 are plan views showing processing steps of the second substrate (3) shown in FIG. 5, and FIGS. 13 through 21 are cross-sectional view showing processing steps of the second substrate (3) shown in FIG. 5, taken along lines of FIGS. 8 through 12.

First, as shown in FIGS. 8 through 12, a black matrix 92 is formed on an insulating substrate 90 using a metal such as chrome (Cr) or chrome oxide (CrOx). An opening 961 is formed on the black matrix 92 through photolithography using a mask (not shown) having a pattern for the opening 961. In this case, the opening 961 is preferably formed at a pixel region. In addition, the opening 961 is preferably formed such that a ratio of a transverse length to a longitudinal length is 1:3, For example, if the transverse length of the opening 961 is 100 µm, the longitudinal length of the opening 961 is preferably 300 µm. Further, the length of the black matrix 92 in the longitudinal direction, that is, the pixel width (PW), is preferably in the range of, for example, 1.5 µm to 35 µm, and the length of the black matrix 92 in the transverse direction, that is, the pixel height (PH), is preferably in the range of, for example, 30 µm to 40 µm. If the black matrix 92 is formed of a photosensitive organic film made of carbon black resin, the opening 961 is formed on the black matrix 92 through exposing, developing, and others, using the mask having the pattern for the opening 961.

Figure 13:
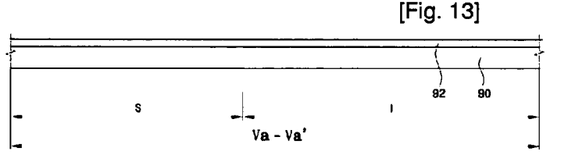
FIGS. 13 through 21 are cross-sectional view showing processing steps of the second substrate shown in FIG. 5, taken along the lines of FIGS. 8 through 12.

After the opening 961 is completed in the described-mentioned manner, the color filter 91 is formed. The color filter 91 is composed of R, G, and B sub color filters 91R, 91G, and 91G, which form a unit pixel. Here, presently used methods for the manufacturing of the color filter 91 include a dyeing method, an electrodeposition method, a pigment dispersion method, a printing method, and the like.

In the following description of the present invention, the method of manufacturing the color filter 91 will be described with regard to a pigment dispersion method.

Figure 9:
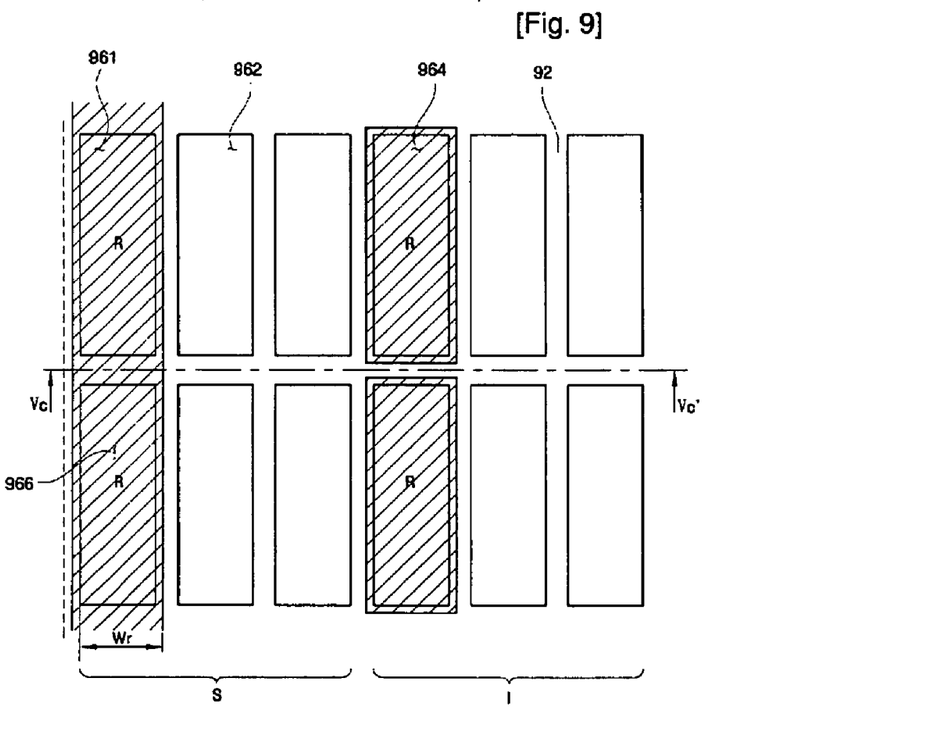
Figure 14:
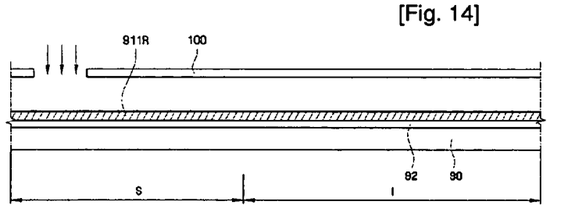
Figure 15:
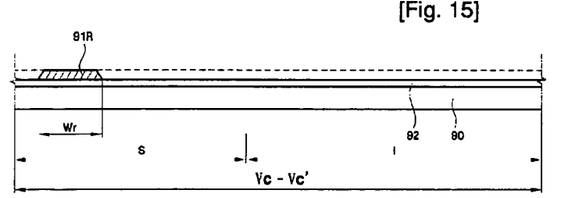

As shown in FIG. 14, a red colored resin 911R is coated on the entire surface of an insulating substrate 90 having a black matrix 92. Then, the patterned mask 100 is applied to the black matrix 92 to then selectively expose the red color resin 911R to form a red sub color filter 91R, as shown in FIGS. 9 and 15. Here, the red sub color filter 91R preferably has a height of 1.6 µm. In the first region S, the red sub color filter 91R is preferably formed over a plurality of pixel regions. That is, the red sub color filter 91R is preferably formed over a plurality of openings 961 and 966. In the second area I, the red sub color filter 91R is preferably formed at each of openings 964.

Figure 10:
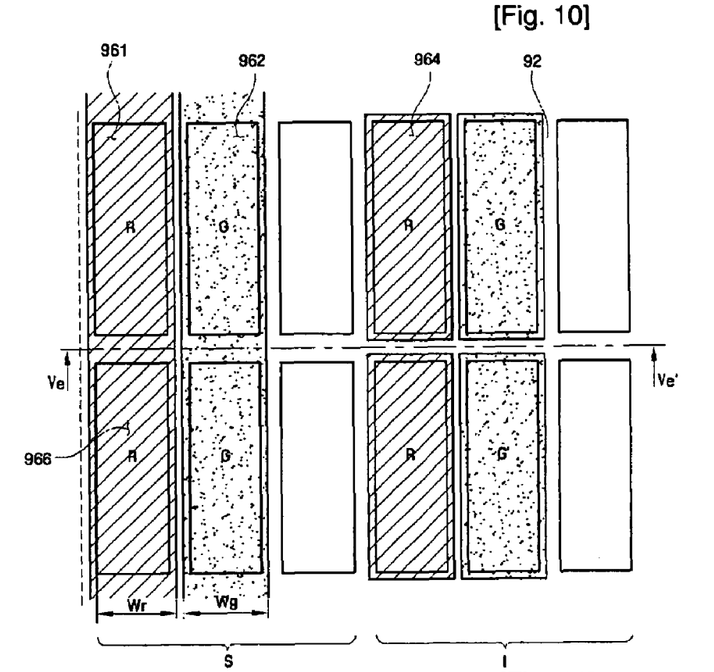
Figure 16:
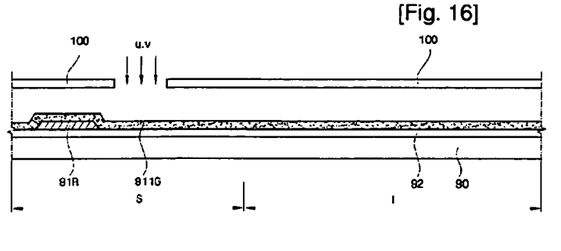
Figure 17:
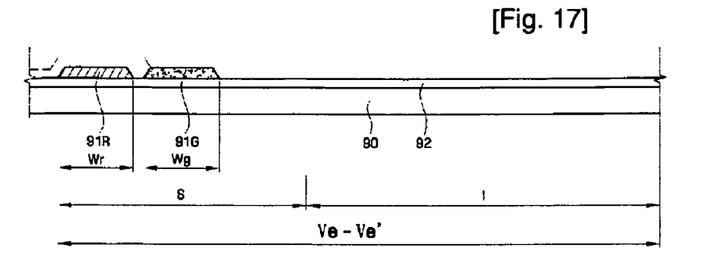

Next, as shown in FIG. 16, a green colored resin 911G is coated on the insulating substrate 90 having the red sub color filter 91R. Then, the patterned mask 100 is applied to the resultant product to then selectively expose the green color resin 911G to form a green sub color filter 91G, as shown in FIGS. 10 and 17. Here, the green sub color filter 91G preferably has a height of 1.7 µm. In the first region S, the green sub color filter 91G is preferably formed over a plurality of pixel regions, while in the second area I, the green sub color filter 91G is preferably formed at each of pixel regions.

Figure 11:
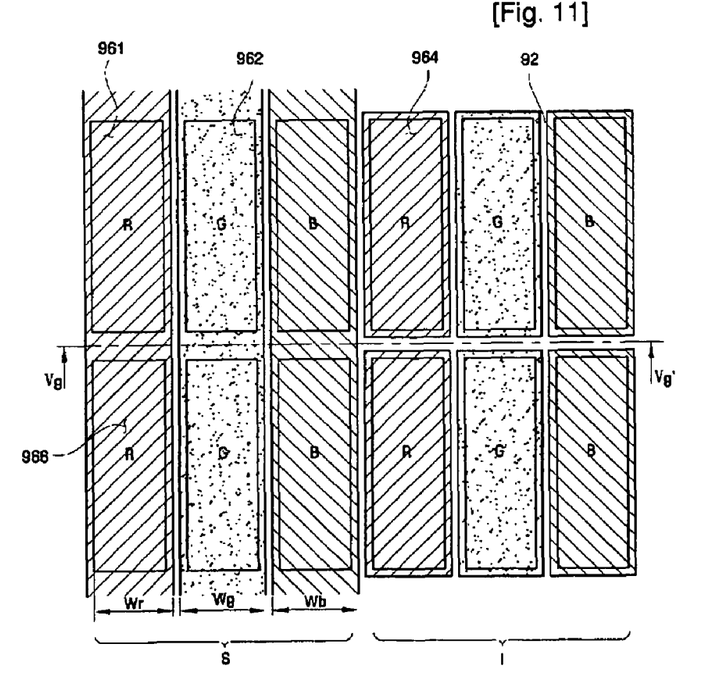
Figure 18:
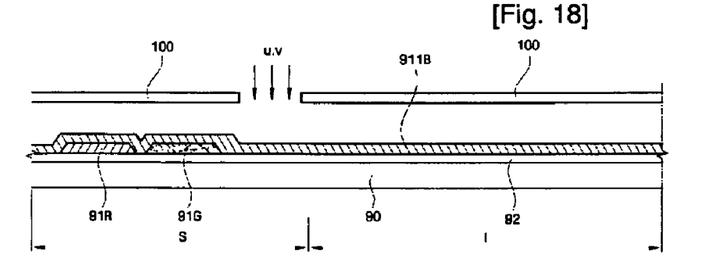
Figure 19:
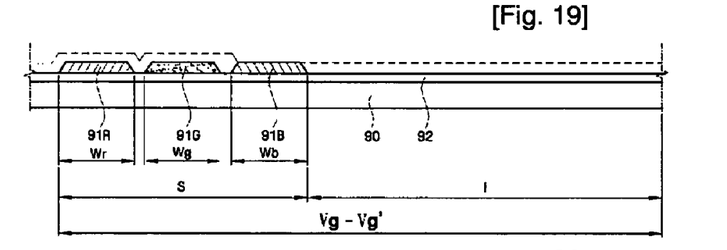

Next, as shown in FIG. 18, a blue colored resin 911B is coated on the insulating substrate 90 having the green sub color filter 91G. Then, the patterned mask 100 is applied to the resultant product to then selectively expose the blue color resin 911B to form a blue sub color filter 91B, as shown in FIGS. 11 and 19. Here, the blue sub color filter 91B preferably has a height of 1.8 µm. In the first region S, the blue sub color filter 91B is preferably formed over a plurality of pixel regions, while in the second area I, the blue sub color filter 91B is preferably formed at each of pixel regions.

After the color filter 91 is formed on the insulating substrate 90 through the above-described processes, an overcoat layer 95 made of a transparent material is formed on the color filter 91 to planarize a surface of the color filter 91. Here, the step of forming the overcoat layer 95 may be optionally omitted.

Thereafter, a common electrode 94 is formed on the overcoat layer 95. Here, the common electrode 94 applies an electric field to the liquid crystal layer 4 by creating a potential difference from a pixel electrode 82 provided on the first substrate 2. The common electrode 94 is formed of a transparent material such as indium tin oxide (ITO) or indium zinc oxide (IZO). Here, the common electrode 94 may be formed in a TN (Twisted Nematic) mode LCD. In contrast, the common electrode 94 may not be formed in an In-Plane Switching (IPS) mode LCD.

Figure 20:
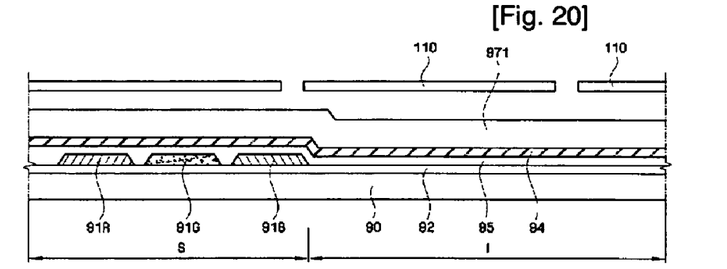

Next, as shown in FIG. 20, a photosensitive organic insulating layer 971 for forming column spacers 97S and 97*i* is formed on the common electrode 94. A mask 110 having a pattern used to form the column spacers 97S and 97*i* is applied to the resultant photosensitive organic insulating layer 971, followed by subjecting to UV irradiation. Here, either a negative photosensitive resin, an exposed portion of which is hardened upon being subjected to UV irradiation, or a positive photosensitive resin, an unexposed portion of which reacts with a developing solution to then be removed, can be employed as the photosensitive organic insulating layer 971.

Figure 12:
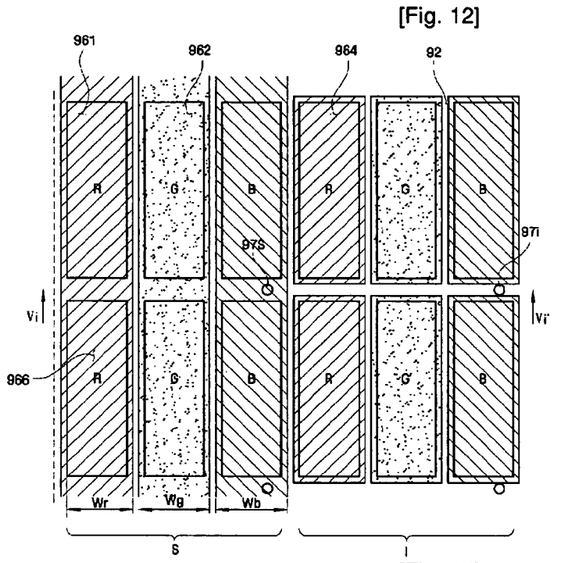
Figure 21:
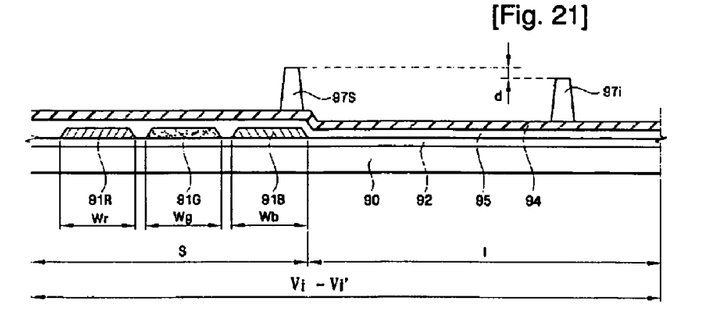

After the photosensitive organic insulating layer 971 is exposed, the photosensitive organic insulating layer 971 is developed and washed, thereby forming the column spacers 97S and 97*i* in the first area S and the second area I, respectively, as shown in FIGS. 12 and 21. Here, each of the column spacers 97S and 97*i* preferably has a height of 3.3 μm. The column spacers 97S and 97*i* may be positioned in non-transmissive areas, for example, on the length of the black matrix 92 in the transverse direction, that is, the pixel height (PH). In addition, the density of the column spacers 97S and 97*i* can vary according to the kind of LCD. For example, one or more column spacers may be provided at each unit pixel.

If the column spacers 97S and 97*i* are formed in the above-described manner, a predetermined height difference "d" which is 60% the thickness of the color filter 91, is created between a top end of the column spacer 97S and a top end of the column spacer 97*i*. Here, the height difference "d" is substantially smaller than thickness of the column spacer 97S, which is because the overcoat layer 95 planarizes an uneven surface of the color filter 91.

In the case where the overcoat layer 95 is not formed, the height difference "d" between the top end of the column spacer 97S formed on the first area S and the top end of the column spacer 97*i* formed on the second area I becomes substantially the same with the thickness of the color filter 91.

As described above, if there is the height difference "d" between the top end of the column spacer 97S formed on the first area S and the top end of the column spacer 97*i* formed on the second area I, a space in which liquid crystal can be spread, that is, a liquid crystal margin, is secured in the first area S, unlike in the second area I, of the second substrate 3. Accordingly, in a subsequent step of combining the first substrate 2 with the second substrate 3, the thickness of the liquid crystal layer 4 can be prevented from increasing at edge portions of the first substrate 2 with the second substrate 3 even when excessive liquid crystal is dispensed into the liquid crystal panel resulting from the combining of the first substrate 2 and the second substrate 3.

An alignment film (not shown) for initial alignment of the liquid crystal layer 4 is formed on the column spacers 97S and 97*i*. Here, the alignment film may be made of a polyimide-based resin material.

Next, an LCD 1 according to a second embodiment of the present invention will be described with reference to FIGS. 22 and 23.

Figure 22:
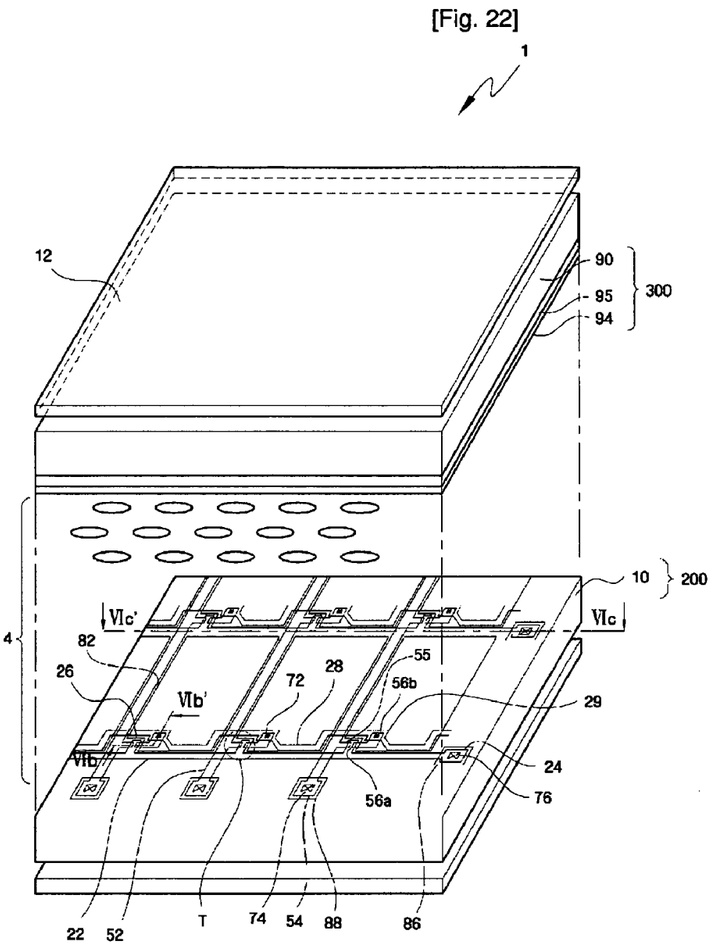
FIG. 22 is a partial perspective view of an LCD according to a second embodiment of the present invention.
Figure 23:
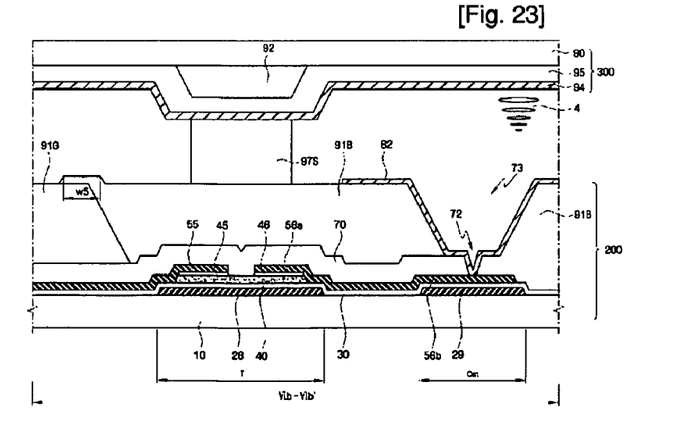
FIG. 23 is a cross-sectional view taken along line VIb-IIb' of FIG. 22.

FIG. 22 is a partial perspective view of an LCD (1) according to a second embodiment of the present invention, FIG. 23 is a cross-sectional view taken along a line VIb-IIb' of FIG. 22. For explanatory convenience, components each having the same function for describing the first embodiment are respectively identified by the same reference numerals, and their repetitive description will be omitted.

The LCD 1 according to the current embodiment of the present invention has substantially the same configuration as the LCD according to the first embodiment of the present invention, as shown in FIGS. 2 and 3, except for the followings. That is, as shown in FIG. 22, a first substrate 200 includes a thin film transistor T, a color filter 91, and a pixel electrode 82 sequentially formed thereon.

In detail, a black matrix 92, an overcoat layer 95 and a common electrode 94 are sequentially formed on one plane of an insulating substrate 90 of a second substrate 300. Here, the black matrix 92 is positioned at an area corresponding to the thin film transistor 'T' of the first substrate 200 in an island shape.

Next, like in the previous embodiment, the second substrate 300 has a first area S and a second area I. Here, the first area S is formed at a non-display region other than a display region while the second area I is formed at the display region, that is, an image displaying region, on the second substrate 300. Here, the first area S may be provided at a predetermined width, e.g., 3 cm, along the peripheral area of the second substrate 300.

With regard to the first substrate 200, a gate line 22, semiconductor layers 45 and 46, and a data line 52 are formed on an insulating substrate 10. A passivation layer 70 made of an organic insulating layer is formed on drain electrodes 522 and 523 and the exposed semiconductor layer 40. Here, a contact hole 72 is formed on the passivation layer 70 to expose a drain electrode pad portion 523 at each pixel.

The color filter 91 including a second contact hole 73 extending from the first contact hole 72 overlaps with the data line 52 on the passivation layer 70, thereby shielding light by means of the data line 52.

The color filter 91 includes red, green and blue sub color filters 91R, 91G and 91B and the respective red, green, and blue sub color filters 91R, 91G and 91B form a unit pixel. The color filter 91 may be arranged in a stripe shape, a mosaic shape, a delta shape, a square arrangement shape, or the like according to the arrangement method. In addition, the respective color filters 91R, 91G and 91B may be formed over a plurality of pixel regions in a stripe type, or at each pixel region in an island type.

In addition, a sub color filter may overlap with a sub color filter of an adjacent pixel by a predetermined width w5 at an area in which the data line 52 is formed. For example, a blue sub color filter 91B may overlap with a green sub color filter 91G of an adjacent pixel by a predetermined width w5, e.g., 3 μm.

Further, in the first area S, the color filter 91 is preferably formed over a plurality of pixel regions. By contrast, in the second area I, the color filter 91 is preferably formed separately at a plurality of pixel regions.

Figure 24:
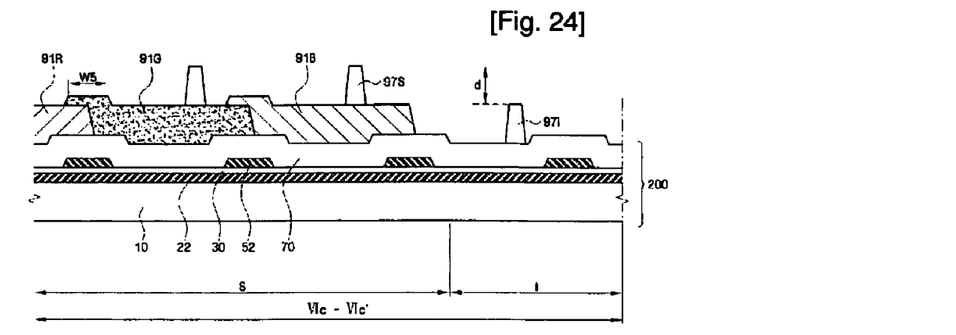
FIG. 24 is a cross-sectional view taken along line VIc-VIc' of FIG. 22.

Meanwhile, column spacers are formed to overlap with non-transmissive areas, for example, the gate line 22 of the first substrate 200. In this case, a predetermined height difference "d" is created between a top end of the column spacer 97S and a top end of the column spacer 97*i*, as shown in FIG. 24. This is because the column spacer 97S formed on the first area S is formed to overlap with the gate line, the passivation layer 70 and the color filter 91 while the column spacer 97*i* formed on the second area I is formed to overlap with the gate line and the passivation layer 70. That is, the height difference "d" created between the top end of the column spacer 97S and the top end of the column spacer 97*i* is substantially the same with the thickness of the color filter 91.

In this case, a space in which liquid crystal can be spread, that is, a liquid crystal margin, is secured in the first area S, unlike in the second area I, of the second substrate 300.

Accordingly, in a subsequent step of combining the first substrate 200 with the second substrate 300, the thickness of the liquid crystal layer 4 can be prevented from increasing at edge portions of the first substrate 200 with the second substrate 300 even when excessive liquid crystal is dispensed into the liquid crystal panel resulting from the combining of the first substrate 200 and the second substrate 300.

Next, an LCD according to a third embodiment of the present invention will be described with reference to FIGS. 25 and 26.

Figure 25:
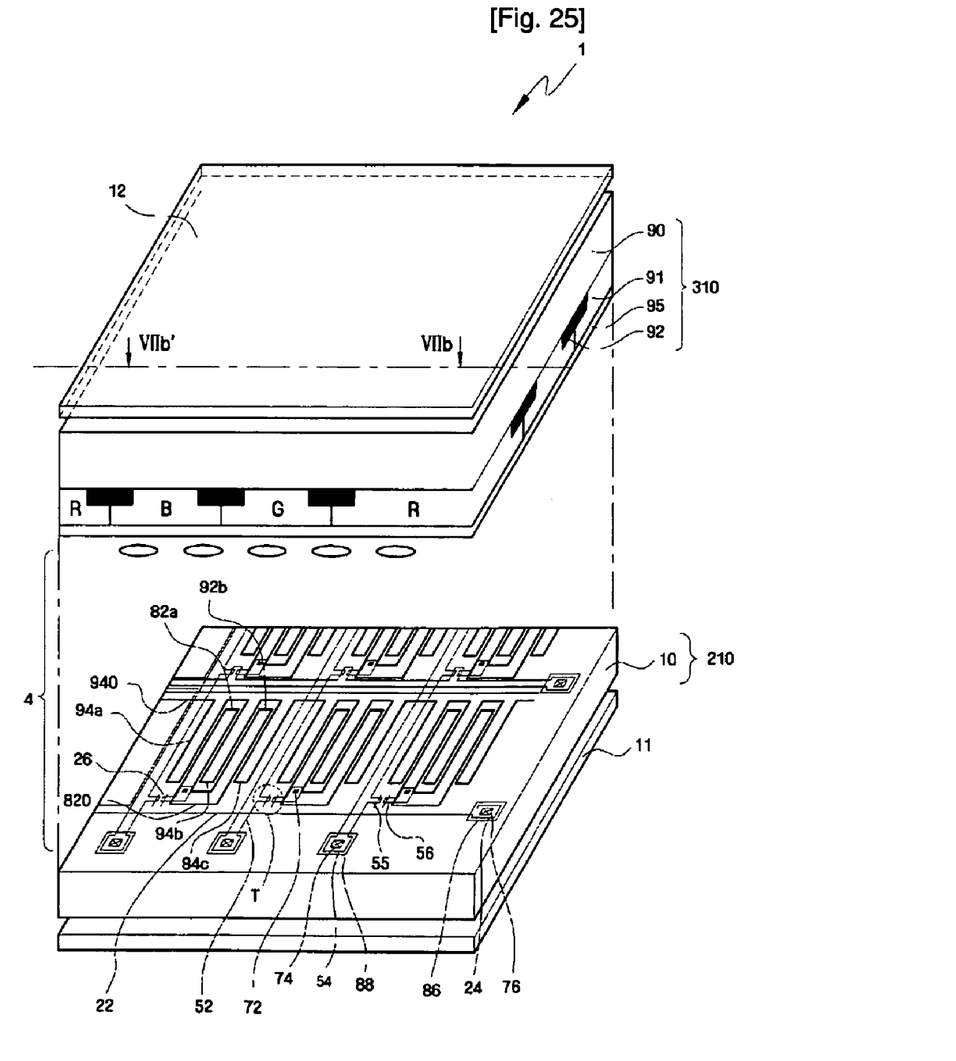
FIG. 25 is a partial perspective view of an LCD according to a third embodiment of the present invention.
Figure 26:
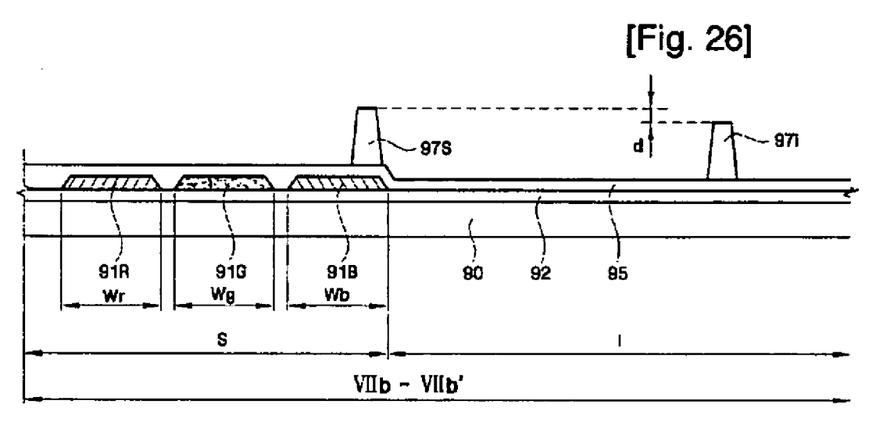
FIG. 26 is a cross-sectional view taken along line VIIb-VIIb' of FIG. 25.

FIG. 25 is a partial perspective view of an LCD (1) according to a third embodiment of the present invention, and FIG. 26 is a cross-sectional view taken along a line VIIb-VIIb' of FIG. 25. For explanatory convenience, components having the same function are respectively identified by the same reference numerals, and a repeated description thereof will be omitted.

The LCD 1 according to the current embodiment of the present invention has substantially the same configuration as the LCD according to the first embodiment of the present invention, as shown in FIGS. 2 and 3, except for the followings. That is, as shown in FIG. 25, a first substrate 210 includes a thin film transistor 'T', pixel electrodes 82 and 83 and common electrodes 98, 99 and 910 sequentially formed thereon.

In detail, a gate line 22 and a data line 52 are formed to intersect each other on the first substrate 210, and the thin film transistor T is formed at an intersection of the gate line 22 and the data line 52. The intersection of the gate line 22 and the data line 52 is defined as a pixel region. Each pixel includes a plurality of common electrodes 98, 99 and 910 and a plurality of pixel electrodes 82 and 83.

In more detail, a lead wire 820 is connected to the thin film transistor T. The plurality of pixel electrodes 82 and 83 are branched from the lead wire 820 in the same direction as the data line 52. In addition, a common wire 940 is separated at predetermined interval from the lead wire 820 in the same direction as the gate line 22. The plurality of common electrodes 98, 99 and 910 are formed at the common wire 940 so as to alternate with the pixel electrodes 82 and 83.

Here, the plurality of pixel electrodes 82 and 83 and the plurality of common electrodes 98, 99 and 910 are formed in various shapes. For example, the pixel electrodes 82 and 83 and the common electrodes 98, 99 and 910 may be bent several times in a zigzag fashion. In such a case, molecules in a liquid crystal layer 4 present in a space between the pixel electrodes 82 and 83 and the common electrodes 98, 99 and 910 are arranged different directions at respective bent portions of the pixel electrodes 82 and 83 and the common electrodes 98, 99 and 910, thereby establishing a multi-domain structure. As a result, compared to the conventional linear electrode structure, the multi-domain structure of the present invention has an improved viewing angle.

In the above-described LCD 1, a substantial opening area is an area in which the horizontal arrangement of liquid crystal is adjusted by a lateral electric field between the pixel electrodes 82 and 83 and the common electrodes 98, 99 and 910. FIG. 25 shows a structure of an LCD having 4 opening areas.

Meanwhile, like in the previous embodiment, the second substrate 310 has a first area S formed over a plurality of pixel regions and a second area I formed separately at each of the plurality of pixel regions.

With the second substrate 310, a black matrix 92, a color filter 91, an overcoat layer 95, a first column spacer 97S, and a second column spacer 97S are sequentially formed on the insulating substrate 90. Here, the overcoat layer 95 may optionally be omitted.

On the overcoat layer 95, the first column spacer 97S and the second column spacer 97S are formed on the first area S and the second area I, respectively. Here, the first column spacer 97S is formed to overlap with the black matrix 92 on the color filter 91 in the first area S, while the second column spacer 97i is formed to overlap with the black matrix 92 on the color filter 91.

The formation of the column spacers 97S and 97i on the common electrode 94 in the above-described manner creates a predetermined height difference "d" which is 60% a thickness of each of sub color filters 91R, 91G and 91B, between a top end of the column spacer 97S formed on the first area S and a top end of the column spacer 97i formed on the second area I. That is, the height difference "d" is smaller than the thickness of each of sub color filters 91R, 91G and 91B because the overcoat layer 95 planarizes an uneven surface of the color filter 91.

In the case where the overcoat layer 95 is not formed, the height difference "d" between the top end of the column spacer 97S formed on the first area S and the top end of the column spacer 97i formed on the second area I becomes substantially the same with the thickness of the color filter 91.

As described above, if there is the height difference "d" between the top end of the column spacer 97S formed on the first area S and the top end of the column spacer 97i formed on the second area I, a space in which liquid crystal can be spread, that is, a liquid crystal margin, is secured in the first area S, unlike in the second area I, of the second substrate 310. Accordingly, in a subsequent step of combining the first substrate 210 with the second substrate 310, the thickness of the liquid crystal layer 4 can be prevented from increasing at edge portions of the first substrate 210 with the second substrate 310 even when excessive liquid crystal is dispensed into the liquid crystal panel resulting from the combining of the first substrate 210 and the second substrate 310.

In conclusion, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

INDUSTRIAL APPLICABILITY

A liquid crystal display (LCD) according to the present invention can be used in a portable multimedia player (PMP), personal digital assistant (PDA), portable digital versatile disk (DVD) player, cellular phone, notebook computer, digital TV, and others. For explanatory convenience, the LCD according to the present invention has been described as being used a computer monitor. However, the present invention is not limited to this and includes the above-mentioned LCDs.

The invention claimed is:

1. A liquid crystal display comprising:
a first substrate; and
a second substrate facing and spaced apart from the first substrate at a predetermined distance,
wherein the second substrate comprises:
an insulating substrate;
a black matrix formed on the insulating substrate;
a first area in which color filters are formed over a plurality of pixel regions, the first area being formed at non-display regions other than display regions where images are displayed;

a second area in which the color filters are formed at each of the plurality of pixel regions, the second area being formed at the display regions;

a first column spacer formed on a color filter in the first area so as to overlap with the black matrix and the color filter; and a second column spacer formed on the black matrix in the second area.

2. The liquid crystal display of claim 1, wherein a predetermined height difference is created between a top end of the first column spacer and a top end of the second column spacer.

3. The liquid crystal display of claim 2, wherein the predetermined height difference is substantially the same as a thickness of the color filter.

4. The liquid crystal display of claim 1, further comprising an overcoat layer between the color filter and the column spacers.

5. The liquid crystal display of claim 4, wherein a predetermined height difference is created between a top end of the first column spacer and a top end of the second column spacer.

6. The liquid crystal display of claim 5, wherein the predetermined height difference is approximately 60% of the thickness of the color filter.

7. The liquid crystal display of claim 4, further comprising a common electrode between the overcoat layer and the column spacers.

8. A liquid crystal display comprising:
a first substrate; and
a second substrate facing and spaced apart from the first substrate at a predetermined distance,
wherein the second substrate comprises:
an insulating substrate;
a gate line formed on the insulating substrate in a transverse direction;
a data line insulated from the gate line and extending in a longitudinal direction to intersect the gate line;
a pixel electrode formed at each pixel defined at an intersection of the gate line and the data line;
a thin film transistor connected to the gate line, the data line and the pixel electrode;
a first area in which color filters are formed over a plurality of pixel regions, the first area being formed at non-display regions other than display regions where images are displayed;
a first column spacer formed on a color filter in the first area so as to overlap with the gate line;
a second area in which the color filters are formed at each of the plurality of pixel regions, the second area being formed at the display regions; and
a second column spacer formed to overlap with the gate line in the second area.

9. The liquid crystal display of claim 8, wherein a predetermined height difference is created between a top end of the first column spacer and a top end of the second column spacer.

10. The liquid crystal display of claim 9, wherein the predetermined height difference is substantially the same as a thickness of the color filter.

11. The liquid crystal display of claim 8, further comprising a common electrode producing a lateral electric field together with the pixel electrode.

* * * * *